United States Patent Office 3,109,483
Patented Nov. 5, 1963

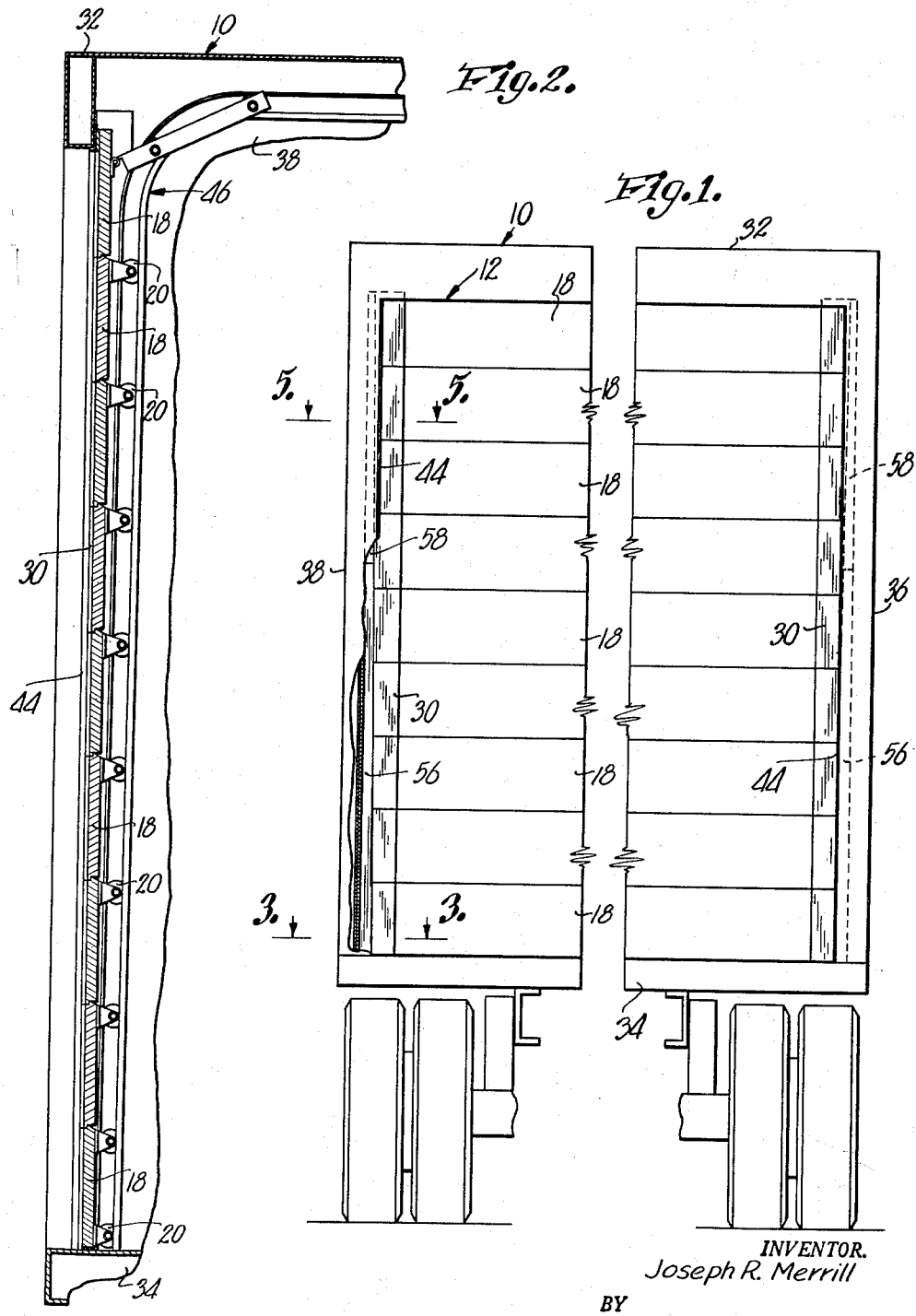

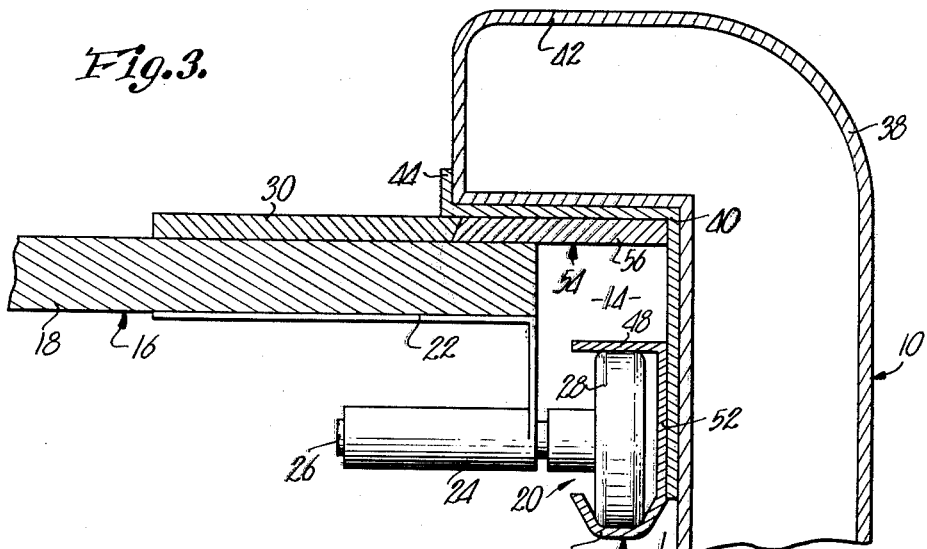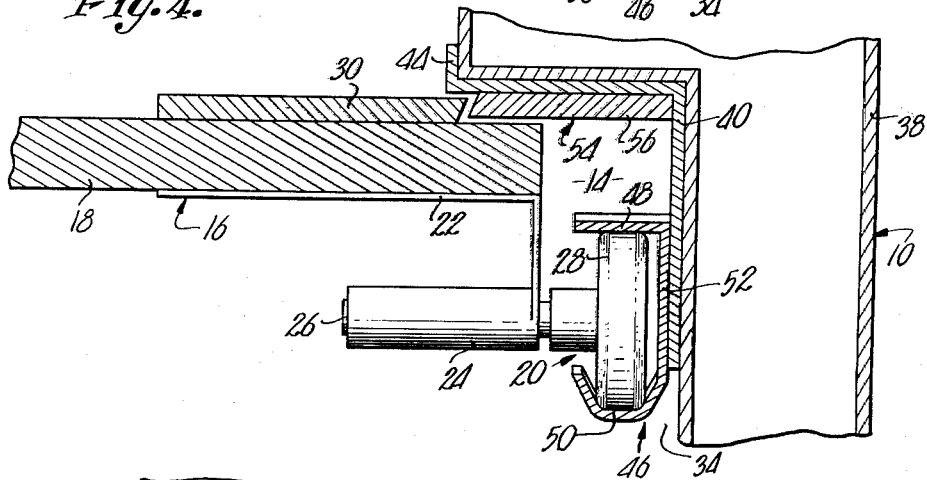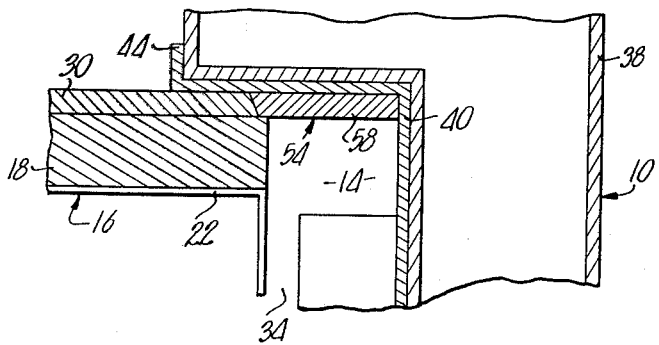

3,109,483
MULTIPLE INTERLOCKING CLOSURE
Joseph R. Merrill, Kansas City, Mo., assignor to Magic Seal Truck Door Corporation, Kansas City, Mo., a corporation of Missouri
Filed Oct. 17, 1960, Ser. No. 63,171
1 Claim. (Cl. 160—209)

The present invention relates to closure apparatus, and more particularly, to a sectional overhead door and/or an upwardly-acting, nonsectional door having particular utility for use with truck bodies.

In the past, it has been customary to close the box of a semitrailer truck, or of a regular truck, by using hinged, swinging doors or canvas, or other materials. Such past practices have presented difficulties since the swinging doors prevent the backing of a truck against a loading dock until after the driver has dismounted from the vehicle and opened the doors, or has been unsatisfactory because the tarpaulin used to close the back of a truck does not provide adequate protection against weather conditions and, for example, could not be used on trucks carrying refrigerated materials or, conversely, in winter time, materials which cannot be permitted to freeze. It is, of course, obvious that tarpaulin coverings provide no reinforcement for the back end of the truck, helping to hold the truck body rigid at the open end. While hinged doors may provide a very limited amount of reinforcement, they are unacceptable for the reasons previously mentioned.

It is undesirable that no closure be provided for the truck since, while the truck is traveling along the highway, a suction is created adjacent the back end thereof which would draw into the truck body debris and dirt from the highway. Also, the backs of trucks suffer from a process known as "racking" when they are driven on the highway, which process causes the rear end of the truck to distort into a parallelogram shape as a result of uneven road conditions.

It is, therefore, the primary object of the present invention to provide closure structure having particular utility for closing a truck body which protects the interior of the truck against exposure to external weather conditions, provides adequate reinforcement of the rear portion of the truck body preventing racking thereof, which seals the interior of the truck body against the entrance therein of dirt and debris from the highway due to the suction created by the truck when traveling therealong, and which permits the truck to be backed against a loading dock or door without the necessity of the driver dismounting from the truck and opening the closure prior to backing the same.

It is another object of the present invention to provide a closure member affording all of the advantages previously described, wherein the closure apparatus includes a frame and a closure member for the frame, wherein the frame and closure member are provided with structure disposed for interengagement when the closure member is moved into closing relationship to the frame, and wherein either the structure on the frame or on the closure member, or on both, is inclined to provide a wedging action between the closure member and the frame.

It is another object of the present invention to provide apparatus of the character above described, wherein the frame is provided with spaced, opposed sides which converge as one extremity of the frame is approached, and wherein the closure member is provided with structure having oppositely facing surfaces converging as one extremity of the member is approached, so that the frame and closure member are provided with complemental engaging surfaces inclined to wedge the frame and closure member against lateral shifting movement when the closure member is in closing relationship to the frame, preventing lateral distortion of the structure to which the frame and closure member are attached.

It is another object of the present invention to provide structure of the character above described, wherein the facing surfaces of the frame sides and the oppositely facing surfaces of the structure on the closure member, are transversely oppositely beveled so that the surfaces provide a wedged seal when the closure member is in a position closing said frame.

It is still another object of the present invention to provide structure of the character above described, wherein a pair of tracks are provided for shiftably mounting the closure member relative to the frame, and wherein roller means are provided on the closure member and engageable with the tracks, the tracks being provided with inclined surfaces converging with said frame as one extremity of the latter is approached so that when the closure member is moved into a position closing said frame, the inclined surfaces act upon the rollers to wedge the closure member between the surfaces and the frame, preventing transverse movement of the closure member relative to the frame.

It is still another object of the present invention to provide structure of the character above described, wherein the transversely beveled facing surfaces of the frame sides, and the transversely beveled surfaces of the structure on the closure member, are provided with first portions beveled in one direction, and second portions beveled in a direction opposite to the one direction so that the beveled seal may be accomplished while not interfering with the opening and closing movement of the closure member relative to the frame.

Further objects and advantages of the present invention will appear hereinafter as the description of this invention proceeds, and various modifications and changes may be made to the structure of the present invention without departing from the spirit thereof. Such further objects and modifications and changes are intended to be covered by the scope of the appended claims.

In the drawings:

FIGURE 1 is a fragmentary, rear elevational view of a truck body provided with structure embodying the present invention;

FIG. 2 is an enlarged, fragmentary, vertical, cross-sectional view taken through the structure shown in FIG. 1, adjacent one side of the truck body;

FIG. 3 is a fragmentary, transverse, cross-sectional view taken along lines 3—3 of FIG. 1 looking in the direction of the arrows, showing the structure in the closed position;

FIG. 4 is a view similar to FIG. 3, showing the structure in a partly opened condition; and FIG. 5 is a fragmentary, transverse, cross-sectional view taken along line 5—5 of FIG. 1 looking in the direction of the arrows.

In the drawings there is disclosed in FIGURE 1, a truck body indicated generally by the numeral 10, provided with closure apparatus designated by the numeral 12. Closure apparatus 12 generally includes a frame assembly 14 and a closure assembly 16.

Closure assembly 16 includes a plurality of articulated, interlocking sections 18, which are hingedly interconnected in a well known manner not shown, each section being provided with at least a pair of roller assemblies 20. Roller assemblies 20 include an L-shaped flange member 22 fixed to a section 18 in any suitable manner such as by screws or the like. A sleeve bearing 24 is provided on flange 22 for rotatably journaling an axle 26, on one end of which is fixedly mounted a wheel 28. Each of the articulated sections 18 is provided with structure 30 adjacent to opposed extremities thereof and extending beyond said extremities.

Truck body 10 includes a truck roof 32, truck floor 34, and truck sides 36 and 38 joining roof 32 and floor 34. A frame mounting member 40 is mounted to each side 36 and 38 respectively, and extends from floor 34 to roof 32. Since the respective sides 36 and 38 are generally L-shaped at the rear extremity to provide a back wall portion, only one of which is shown in the drawings and indicated by the numeral 42, the frame mounting member 40 is also generally L-shaped in cross section and is provided with a rearwardly-extending flange 44.

A track 46 is mounted to the interiorly facing side of each leg of each frame member 40 adjacent the forwardmost extremity thereof. As indicated in FIG. 2, tracks 46 are inclined to converge with the foot portion of member 40 as the lower extremity of the latter is approached. Each track 46 includes a flat wheel-engaging surface 48 and opposed, generally U-shaped wheel-engaging surface 50, and an integral connecting portion 52 joining one side of surfaces 48 and 50 and integral therewith, and providing the surface for mounting tracks 46 to member 40. The opposite side of track 46 from connecting portion 52, is open to permit the passage of axles 26. The distance between surfaces 48 and 50 is sufficient to rollably accommodate wheel 28 confined therebetween.

Frame 14 is further provided with frame sides 54 fixed to member 40 and extending toward the side margins of interlocking sections 18. The frame sides 54 consist of first portions 56, and second portions 58 above first portions 56. It will be noted that opposed sides 54 are inclined to converge as the lower extremity thereof, adjacent floor 34, is approached. First portions 56 of frames 54 are beveled to face slightly outwardly toward the rear of truck body 10, while second portions 58 are beveled to face slightly interiorly of truck body 10. Structures 30 on sections 18 are provided with surfaces on the extremities thereof proximal to frame 14, which are beveled oppositely to the portions 56 or 58 of sides 54 with which they respectively engage.

The beveled surfaces of structures 30 on sections 18, present oppositely facing, continuous surfaces which converge as the lowermost of the sections 18 is approached when said closure assembly 16 is in position closing frame assembly 14.

In operation, when the closure assembly 16 is moved to the position shown in FIG. 1 of the drawings, the sections 18 are guided along the tracks 46 in a manner well known in the overhead door art. Since the tracks 46 are inclined to converge with frame 14 as the lowermost extremity of the latter is approached, the closure assembly 16 in the form of its interlocked sections 18, is wedged against frame assembly 14 and particularly, against frame mounting members 40, first portions 56, and second portions 58. Therefore, it can be seen that the door is wedged between the tracks 46 and the frame assembly 14 against longitudinal movement relative to the truck body 10. In addition, the beveled surfaces of portions 56 and 58, and structures 30, provide a wedge seal along the side extremities of closure assembly 16, preventing infiltration of dirt into the truck body 10 and sealing the truck body 10 against outside atmospheric conditions. It is to be noted that the bevels of the respective surfaces reverse as the upper extremity of closure assembly 16 is approached, the latter being necessary in order to permit the door to be opened, since the upper sections are tipped back immediately upon opening action, due to the curves in tracks 46. Additionally, the surfaces of frame sides 54, which converge as the lower extremity of frame assembly 14 is approached, and the surufaces of structures 30 which form continuous converging surfaces on closure assembly 16, as the lower extremity thereof is approached, provide a wedging action when the closure assembly is moved into the position shown in FIG. 1, preventing lateral distorting movement of the closure assembly 16, frame assembly 14, and the rear end of the truck body, thereby preventing the truck body from racking and accomplishing the objects of the present invention.

Having thus described the invention, what is claimed as new and desired to be secured by Letters Patent is:

Apparatus for closing an opening in the wall structure of a truck body enclosure comprising a frame having a pair of elongated, spaced-apart, opposed sides secured to the interior of said wall structure flanking opposed, upright sides of said opening, the opposed, facing side margins of said frame sides converging as the lowermost ends thereof are approached, the lower portion of each of said side margins presenting a first beveled surface lying in a generally vertical plane at an acute angle with respect to the major plane of said wall structure and facing in a direction outwardly of the enclosure, the upper portion of each of the side margins presenting a second beveled surface lying in a generally vertical plane at an acute angle with respect to the major plane of the wall structure and facing in a direction inwardly of the enclosure; parallel, horizontally spaced track means positioned uprightly on said frame sides in disposition causing the lower extremity of the track means to be located in closer spaced relationship to the major plane of said wall structure than the portion of said track means adjacent to the upper extremities of said frame sides, said track means extending along the interior of the roof of the enclosure to permit movement of the door to a position underlying the roof; and a vertically shiftable, articulated door carried by said track means for movement from a position underlying said roof to a position in closing relationship to said opening, the door being provided with a pair of lower and a pair of upper beveled surfaces proximal to the side margins thereof, said lower surfaces converging as the lower extremity of the door is approached, said lower and upper door surfaces being disposed to substantially complementally mate with corresponding first and second surfaces of said frame sides when said door is closed, whereby said door engages said wall structure and the corresponding surfaces of the door and the frame sides mate to wedge the door tightly in place when closed.

References Cited in the file of this patent
UNITED STATES PATENTS

| | | |
|---|---|---|
| 562,935 | Sweet | June 30, 1896 |
| 1,995,431 | McCloud | Mar. 26, 1935 |
| 2,703,141 | McKee | Mar. 1, 1955 |
| 2,871,932 | Stroup | Feb. 3, 1959 |